(12) United States Patent
Fu

(10) Patent No.: US 10,261,965 B2
(45) Date of Patent: Apr. 16, 2019

(54) AUDIO GENERATION METHOD, SERVER, AND STORAGE MEDIUM

(71) Applicant: TENCENT TECHNOLOGY (SHENZHEN) COMPANY LIMITED, Shenzhen (CN)

(72) Inventor: Hongcheng Fu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/845,906

(22) Filed: Dec. 18, 2017

(65) Prior Publication Data

US 2018/0107735 A1    Apr. 19, 2018

Related U.S. Application Data

(63) Continuation of application No. PCT/CN2016/094888, filed on Aug. 12, 2016.

(30) Foreign Application Priority Data

Sep. 23, 2015  (CN) .......................... 2015 1 0612210

(51) Int. Cl.
*G10H 1/06* (2006.01)
*G06F 16/683* (2019.01)
(Continued)

(52) U.S. Cl.
CPC ...... *G06F 16/683* (2019.01); *G06F 17/30743* (2013.01); *G10H 1/0008* (2013.01);
(Continued)

(58) Field of Classification Search
CPC ....... G10H 2210/066; G10H 2210/061; G10H 2210/081; G06K 9/00087; G10G 1/04
See application file for complete search history.

(56) References Cited

U.S. PATENT DOCUMENTS 6,528,715 B1* 3/2003 Gargi .................. G10H 1/0033
                                                        84/615
7,378,588 B1* 5/2008 Changfan ......... G06F 17/30743
                                                        84/609
(Continued)

FOREIGN PATENT DOCUMENTS

CN        1737796 A      2/2006
CN      101398827 A      4/2009
(Continued)

OTHER PUBLICATIONS

The World Intellectual Property Organization (WIPO) International Search Report for PCT/CN2016/094888 dated Nov. 11, 2016 6 Pages (including translation).

*Primary Examiner* — Marlon T Fletcher
(74) *Attorney, Agent, or Firm* — Anova Law Group, PLLC

(57) ABSTRACT

Audio generation method, server and storage medium are provided. The method includes obtaining a comparison audio, and performing a theme extraction on the comparison audio to obtain a comparison note sequence, the comparison note sequence comprising comparison note positions, comparison note pitches, and a comparison note duration; obtaining an original audio matching with the comparison audio via audio retrieval, and obtaining an original note sequence corresponding to the original audio by performing a theme extraction on the original audio, the original note sequence comprising original note positions, original note pitches, and an original note duration; calculating theme distances between fragments of the comparison audio and fragments of the original audio according to the comparison note sequence and the original note sequence; and generating an audio by capturing a fragment that is of the original audio and that satisfies the smallest theme distance.

18 Claims, 10 Drawing Sheets

(51) Int. Cl.
  *G06F 17/30* (2006.01)
  *G10H 1/00* (2006.01)
  *G10L 25/78* (2013.01)
  *G10L 25/90* (2013.01)
  *G10L 25/54* (2013.01)

(52) U.S. Cl.
  CPC ............ G10H 1/0033 (2013.01); G10L 25/54 (2013.01); G10L 25/78 (2013.01); G10L 25/90 (2013.01); *G10H 2210/061* (2013.01); *G10H 2210/066* (2013.01); *G10H 2240/141* (2013.01); *G10L 2025/906* (2013.01)

(56) References Cited

U.S. PATENT DOCUMENTS

| | | | |
|---|---|---|---|
| 9,280,960 B1* | 3/2016 | Clarke | G10H 7/00 |
| 9,747,876 B1* | 8/2017 | Clarke | G10G 1/00 |
| 2006/0251457 A1* | 11/2006 | Lapstun | B41J 3/36 |
| | | | 400/88 |
| 2007/0141541 A1* | 6/2007 | Chan | G09B 5/06 |
| | | | 434/236 |
| 2007/0214941 A1* | 9/2007 | Kourbatov | G10H 1/40 |
| | | | 84/609 |
| 2008/0126304 A1* | 5/2008 | Changfan | G06F 17/30743 |
| 2008/0190272 A1* | 8/2008 | Taub | G10H 1/0058 |
| | | | 84/645 |
| 2018/0053039 A1* | 2/2018 | Anders | G06K 9/00758 |

FOREIGN PATENT DOCUMENTS

| | | |
|---|---|---|
| CN | 102521281 A | 6/2012 |
| CN | 103823867 A | 5/2014 |

* cited by examiner

US 10,261,965 B2

AUDIO GENERATION METHOD, SERVER, AND STORAGE MEDIUM

RELATED APPLICATIONS

This application is a continuation application of PCT Patent Application No. PCT/CN2016/094888, filed on Aug. 12, 2016, which claims priority to Chinese Patent Application No. 201510612210.0, filed on Sep. 23, 2015, all of which is incorporated herein by reference in their entirety.

FIELD OF THE TECHNOLOGY

The present disclosure generally relates to the field of computer technologies, and in particular, relates to an audio generation method, a server, and a storage medium.

BACKGROUND OF THE DISCLOSURE

With development of computer technologies and digital multimedia, people download multimedia music through a network, and make fragments of favorite music as ringtones.

An existing method for capturing a piece of music includes: retrieving the to-be-captured music, determining a capturing start point and a capturing end point using dragging on professional audio capturing software. This is hard to implement. When a user forgets a song name or lyrics, the user cannot find the to-be-captured music, and has difficulties in determining the start point and the end point of a melody by merely using human ears.

SUMMARY

One aspect of the present disclosure provides an audio generation method, applied to a server including at least a memory and a processor. The method includes obtaining a comparison audio, and performing a theme extraction on the comparison audio to obtain a comparison note sequence, the comparison note sequence comprising comparison note positions, comparison note pitches, and a comparison note duration; obtaining an original audio matching with the comparison audio via audio retrieval, and obtaining an original note sequence corresponding to the original audio by performing a theme extraction on the original audio, the original note sequence comprising original note positions, original note pitches, and an original note duration; calculating theme distances between fragments of the comparison audio and fragments of the original audio according to the comparison note sequence and the original note sequence; and generating an audio by capturing a fragment that is of the original audio and that satisfies the smallest theme distance.

Another aspect of the present disclosure provides a server. The server includes a memory, storing program instructions for an audio generation method, and a processor, coupled to the memory. When executing the program instructions, the processor is configured for: obtaining a comparison audio, and performing a theme extraction on the comparison audio to obtain a comparison note sequence, the comparison note sequence comprising comparison note positions, comparison note pitches, and a comparison note duration; obtaining an original audio matching with the comparison audio via audio retrieval, and obtaining an original note sequence corresponding to the original audio by performing a theme extraction on the original audio, the original note sequence comprising original note positions, original note pitches, and an original note duration; calculating theme distances between fragments of the comparison audio and fragments of the original audio according to the comparison note sequence and the original note sequence; and generating an audio by capturing a fragment that is of the original audio and that satisfies the smallest theme distance.

Another aspect of the present disclosure provides a non-transitory computer-readable storage medium containing computer-executable program instructions for, when executed by a processor, performing an audio generation method. The method includes obtaining a comparison audio, and performing a theme extraction on the comparison audio to obtain a comparison note sequence, the comparison note sequence comprising comparison note positions, comparison note pitches, and a comparison note duration; obtaining an original audio matching with the comparison audio via audio retrieval, and obtaining an original note sequence corresponding to the original audio by performing a theme extraction on the original audio, the original note sequence comprising original note positions, original note pitches, and an original note duration; calculating theme distances between fragments of the comparison audio and fragments of the original audio according to the comparison note sequence and the original note sequence; and generating an audio by capturing a fragment that is of the original audio and that satisfies the smallest theme distance.

Details of one or more embodiments of the present disclosure are provided in the accompany drawings and descriptions below. Other features, objectives, and advantages of the present disclosure will become obvious in the descriptions, the accompany drawings, and the claims.

BRIEF DESCRIPTION OF THE DRAWINGS

To describe the technical solutions of the embodiments of the present disclosure or the prior art more clearly, the following briefly introduces the accompanying drawings required for describing the embodiments or the prior art. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

According to various embodiments disclosed in the present disclosure, an audio generation method, a server, and a storage medium are provided.

Figure 1:
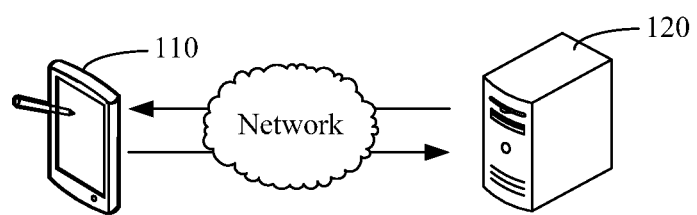
FIG. 1 is a diagram of an exemplary application environment of an audio generation method according to some embodiments of the present disclosure.

FIG. 1 is a diagram of an application environment for performing an audio generation method according to some embodiments of the present disclosure. As shown in FIG. 1, the application environment includes a terminal 110 and a server 120. The terminal 110 and the server 120 communicate with each other via a network.

The terminal 110 may be a smart phone, a tablet computer, a notebook computer, a desktop computer, or the like, but is not limited thereto. The terminal 110 sends comparison audio to the server 120 via the network, and generates an audio request, and the server 120 may respond to the request sent by the terminal 110.

Figure 2:
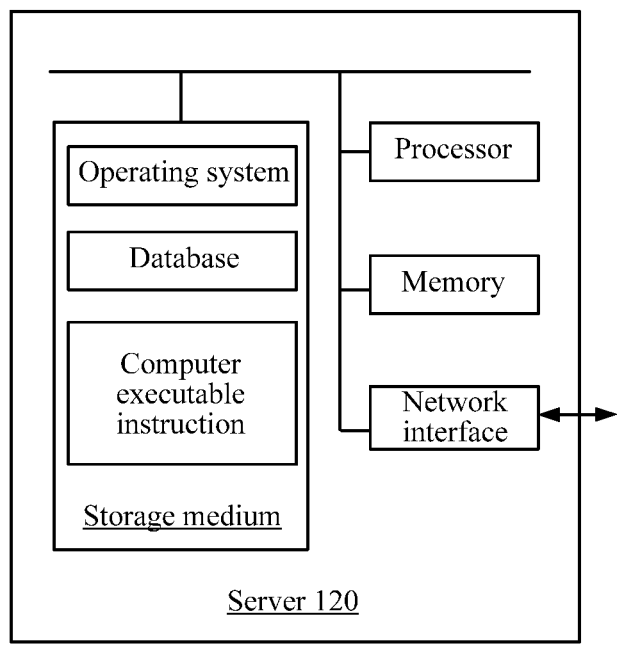
FIG. 2 is an internal structural diagram of an exemplary server in FIG. 1 according to some embodiments of the present disclosure.

In an exemplary embodiment, an internal structure of the server 120 in FIG. 1 is shown in FIG. 2. The server 120 includes a processor, a storage medium, a memory, and a network interface that are connected by a system bus. The storage medium of the server 120 stores an operating system, a database, and a computer executable instruction. The database is used for storing data, such as original audio and an original note sequence of the original audio. When the instruction is executed by a CPU, an audio generation method applicable to the server 120 can be implemented. The processor of the server 120 is configured to provide computing and control capabilities to support running of the entire server 120. The memory of the server 120 provides an environment for execution of the computer executable instruction in the storage medium. The network interface of the server 120 is configured to connect to and communicate with an external terminal 110 via a network, for example, receiving comparison audio sent by the terminal 110 and returning data to the terminal 110.

Figure 3:
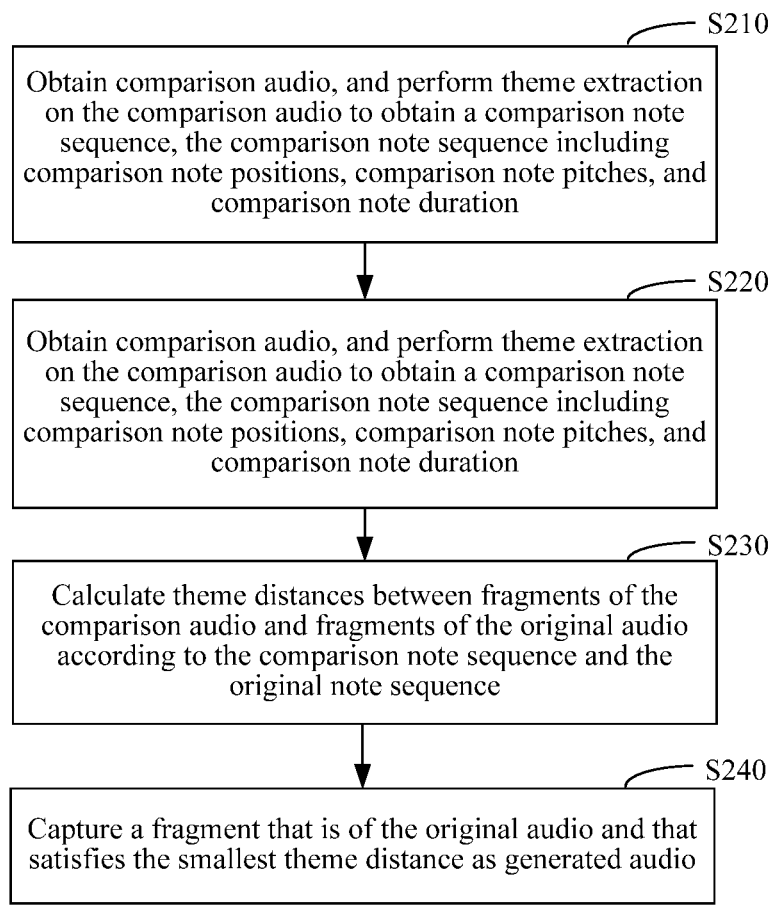
FIG. 3 is a flowchart of an exemplary audio generation method according to some embodiments of the present disclosure.

In an exemplary embodiment, as shown in FIG. 3, an audio generation method is provided. Using a server applied to the foregoing application environment as an example for description, the method includes the following exemplary steps.

In S210: Obtaining comparison audio, and performing theme extraction on the comparison audio to obtain a comparison note sequence, the comparison note sequence including comparison note positions, comparison note pitches, and comparison note duration.

For example, when a user needs to generate a piece of favorite music, the user may upload comparison audio to the server using a terminal. The comparison audio is a piece of music crooned by the user by using the terminal or is a piece of music obtained in another manner. A theme refers to a main melody of a part in music, and includes many notes. Attributes of each note include a note position, a note pitch, and note duration. The note position refers to a start timestamp of a note, and the note pitch refers to a level of a sound, and is determined by a quantity of vibrations (that is, a vibration frequency) of a sounding body within a period. A high vibration frequency of a sound indicates a high level of the sound, and a low vibration frequency of a sound indicates a low level of the sound. The note duration refers to a time that a note lasts. Theme extraction is performed on the comparison audio to obtain a comparison note sequence, and the comparison note sequence includes features of the comparison audio, facilitating capturing of matched fragments in the original audio by using the features. A theme extraction process mainly includes steps of extracting a pitch frequency, normalizing the pitch frequency, and segmenting notes, finally obtaining segmented note segments, determining comparison note positions according to start positions of the note segments, determining comparison note pitches according to pitch frequency information of the note segments, and determining comparison note duration according to lengths of the note segments.

In S220: Obtaining original audio matching with the comparison audio via audio retrieval, and obtaining an original note sequence corresponding to the original audio, the original note sequence being obtained by performing theme extraction on the original audio, and the original note sequence including original note positions, original note pitches, and original note duration.

For example, because the comparison audio is audio data, instead of text-based retrieval, the original audio matching with the comparison audio needs to be found via content-based audio retrieval. The content-based audio retrieval refers to giving different semantics for different audio data by audio feature analysis, so as to enable audio with same semantics to maintain acoustical similarity. After the matched original audio is obtained by retrieval, the original note sequence corresponding to the original audio is obtained. The original note sequence is stored in association with the original audio. Once new music is stored in a music library, a theme extraction algorithm the same as that in in S210 is used for extracting the original note sequence. The original note sequence includes original note positions, original note pitches, and original note duration. It may be understood that before theme extraction, format conversion may be performed on the audio to convert the audio into a preset format, for example, a transcoding tool is used for converting the audio into audio in a uniform 8k16bit PCM (pulse code modulation) format.

In S230: Calculating theme distances between fragments of the comparison audio and fragments of the original audio according to the comparison note sequence and the original note sequence.

For example, the theme distance is used for representing a matching degree between the comparison audio and the original audio. A smaller theme distance indicates a higher matching degree between the comparison audio and the original audio. A pitch difference is calculated by using the comparison note pitches and the original note pitches, a duration difference is calculated by using the comparison note duration and the original note duration, and a theme distance is calculated by using a preset algorithm comprehensively with reference to the pitch difference and the duration difference. The preset algorithm may be self-defined, a weight factor may be set, and so on according to requirements. Because the length of the comparison audio and the length of the original audio may be different, when a theme distance is calculated, comparison calculation may be performed on fragments of the original note sequence and fragments of the comparison note sequence by using a self-defined rule. For example, comparison calculation is performed on an original note sequence corresponding to original notes at continuous positions, and a comparison note sequence, or an original note sequence corresponding to original notes at discontinuous positions may be selected, so as to further improve a coverage range and correctness of theme distance calculation.

In S240: Capturing a fragment that is of the original audio and that satisfies the smallest theme distance as generated audio.

For example, when the theme distance is calculated, an original note sequence satisfying the smallest theme distance is a matched original note sequence, and a start note position and an end note position of the matched original note sequence are obtained. The start note position and the end note position respectively correspond to a start timestamp and an end timestamp. An original audio fragment between the start timestamp and the end timestamp is captured as generated audio. In an exemplary embodiment, the generated audio is used as a candidate ringtone and sent to a terminal for a user to select and invoke.

In this exemplary embodiment, the comparison audio is obtained, and theme extraction is performed on the comparison audio to obtain the comparison note sequence, the comparison note sequence including comparison note positions, comparison note pitches, and comparison note duration; the original audio matching with the comparison audio is obtained via audio retrieval, and the original note sequence corresponding to the original audio is obtained, the original note sequence being obtained by performing theme extraction on the original audio, and the original note sequence including original note positions, original note pitches, and original note duration; theme distances between the fragments of the comparison audio and the fragments of the original audio are calculated according to the comparison note sequence and the original note sequence; and a fragment that is of the original audio and that satisfies the smallest theme distance is captured as generated audio. The corresponding original audio is directly obtained via audio retrieval from the comparison audio, and title or lyrics retrieval of the original audio is not required. The audio generation method is efficient and convenient. The theme distances are calculated, and the fragment of the original audio is obtained based on automatic matching according to the smallest theme distance; instead of manually capturing a fragment of the original audio. Thus, a user only needs to upload the comparison audio. The operations are convenient and the captured fragment is correct.

Figure 4:
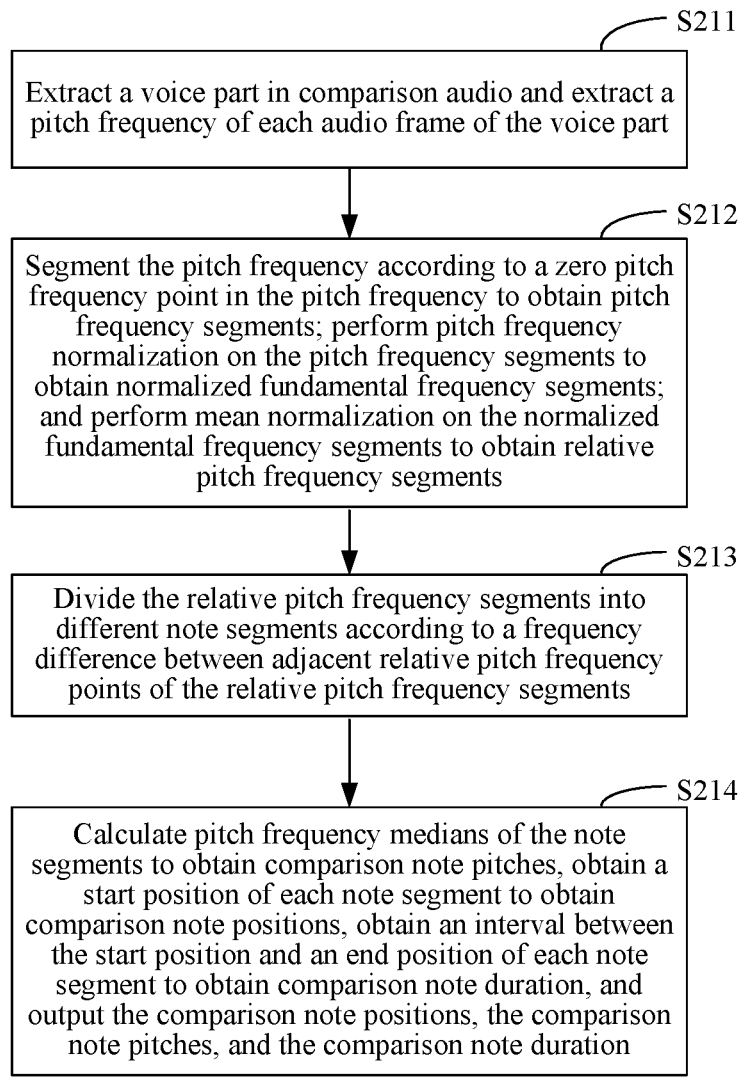
FIG. 4 is a flowchart of obtaining a comparison note sequence according to some embodiments of the present disclosure.

In an exemplary embodiment, as shown in FIG. 4, the exemplary step S210 includes the following exemplary steps.

In S211: Extracting a voice part in the comparison audio and extract a pitch frequency of each audio frame of the voice part.

For example, the voice part can be obtained by separating a voice and an accompaniment in the comparison audio by using a classic human voice separation algorithm may be used, for example, a neural network-based voice extraction algorithm. Audio frames are obtained by performing windowing processing on the voice part, and pitch frequencies of the audio frames are obtained using a pitch frequency extraction algorithm. A classic pitch frequency extraction algorithm may be used, such as an autocorrelation function pitch frequency extraction algorithm or a wavelet transform based pitch frequency extraction algorithm.

In S212: Segmenting the pitch frequency according to a zero pitch frequency point in the pitch frequency to obtain pitch frequency segments; perform pitch frequency normalization on the pitch frequency segments to obtain normalized pitch frequency segments; and perform mean normalization on the normalized pitch frequency segments to obtain relative pitch frequency segments.

For example, the pitch frequency includes pitch frequency points, each pitch frequency point has a corresponding pitch frequency value, and a pitch frequency point with a pitch frequency value of 0 is a zero pitch frequency point. When a quantity of zero pitch frequency points exceeds a preset number, a corresponding pitch frequency segment is a mute segment, and all mute segments divide all the pitch frequencies into multiple valid pitch frequency segments. Pitch frequency normalization is performed on the valid pitch frequency segments to obtain normalized pitch frequency segments. In this case, the pitch frequency points are converted into normalized pitch frequency points, and each normalized pitch frequency point has a corresponding normalized pitch frequency value. Pitch frequency normalization refers to processing the pitch frequency segments to make the pitch frequency segments smooth, for example, by using a median filter operation, a singular point removing operation, or a filling operation. Because users start crooning with different keys, absolute pitch frequency values of the comparison audio and the original audio differ greatly. A start key difference problem is solved by using mean normalization. Each pitch frequency segment or all the pitch frequency segments are used as a unit to calculate a pitch frequency average value. The pitch frequency average value is subtracted from a normalized pitch frequency value of each normalized pitch frequency point of the normalized pitch frequency segments. In this case, the normalized pitch frequency segments are converted into the relative pitch frequency segments, the normalized pitch frequency points are converted into relative pitch frequency points, and each relative pitch frequency point has a corresponding relative pitch frequency value, thereby reducing an effect of the start key difference. It may be understood that specific algorithms for pitch frequency normalization and mean normalization may be self-defined according to requirements.

In S213: Dividing the relative pitch frequency segments into different note segments according to a frequency difference between adjacent relative pitch frequency points of the relative pitch frequency segments.

For example, when a frequency difference between relative pitch frequency values of two adjacent relative pitch frequency points is greater than a preset threshold, the two adjacent relative pitch frequency points respectively belong to two different note segments. The preset threshold may be self-defined. For example, the preset threshold may be defined to be 0.05.

In S214: Calculating pitch frequency medians of the note segments to obtain the comparison note pitches, obtain a start position of each note segment to obtain the comparison note positions, obtain an interval between the start position and an end position of each note segment to obtain the comparison note duration, and output the comparison note positions, the comparison note pitches, and the comparison note duration.

For example, pitch frequency values of each note segment are sorted according to values, and a sorted pitch frequency value at an intermediate position is a pitch frequency median. The pitch frequency median is a note pitch of the note segment, that is, the comparison note pitch. A start position of the note segment corresponds to a start timestamp of the note segment, that is, the comparison note position. An interval between the start position and an end position of the note segment is note duration of the note segment, that is, the comparison note duration. The note segments of the comparison audio compose the comparison note sequence.

Figure 5:
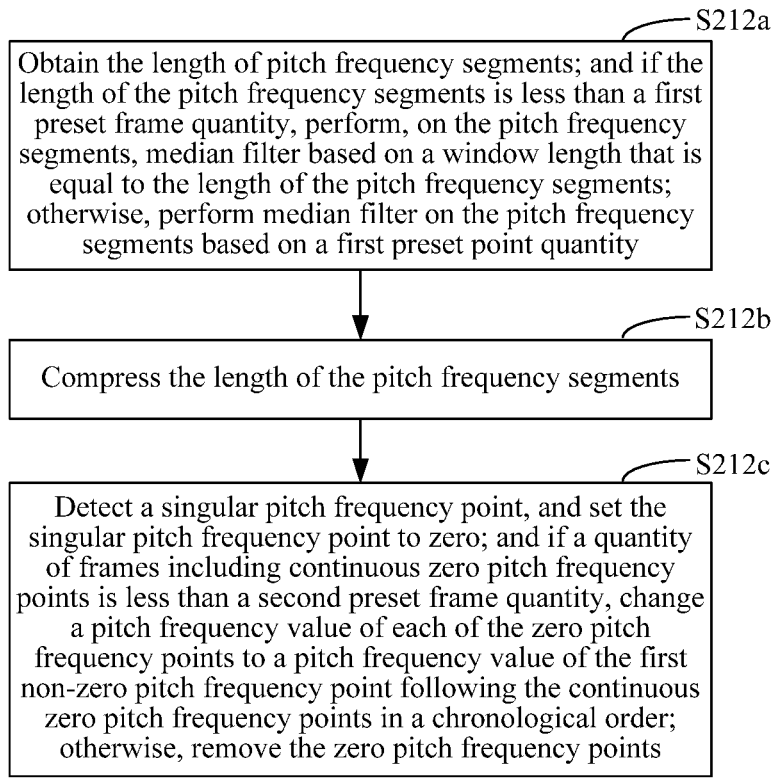
FIG. 5 is a flowchart of performing pitch frequency normalization on a pitch frequency segment to obtain a normalized pitch frequency according to some embodiments of the present disclosure.

In an exemplary embodiment, as shown in FIG. 5, the exemplary step S212 includes the following exemplary steps.

In S212a: Obtaining the length of the pitch frequency segments; and when the length of the pitch frequency segments is less than a first preset frame quantity, perform, on the pitch frequency segments, median filter based on a window length that is equal to the length of the pitch frequency segments; otherwise, perform median filter on the pitch frequency segments based on a first preset point quantity.

For example, the first preset frame quantity may be self-defined, for example, 35 frames, and the first preset point quantity may be self-defined, for example, 10 points. When the length of a pitch frequency segment is less than 35 frames, median filter based on a window length that is equal to the length of the pitch frequency segments is performed on the pitch frequency segments. When the length of the pitch frequency segments is greater than or equal to 35 frames, 10-point-based median filter is performed on each frame of the pitch frequency segment.

In S212b: Compressing the length of the pitch frequency segments.

For example, to reduce a calculation amount and improve matching efficiency, the length of a pitch frequency segment is compressed, and a compression algorithm may be self-defined. For example, for each five pitch frequency points, a pitch frequency value of the first pitch frequency point is selected, and the length of the pitch frequency segment is compressed by five times.

In S212c: Detecting a singular pitch frequency point, and set the singular pitch frequency point to zero; and when a quantity of frames including continuous zero pitch frequency points is less than a second preset frame quantity, change a pitch frequency value of each of the zero pitch frequency points to a pitch frequency value of the first non-zero pitch frequency point following the continuous zero pitch frequency points in a chronological order; otherwise, remove the zero pitch frequency points.

For example, the singular pitch frequency point is a pitch frequency point, where a difference between a pitch frequency value of the pitch frequency point and a pitch frequency value of an adjacent pitch frequency value is greater than a preset threshold, for example, the preset threshold being set to 50. After the singular pitch frequency point is detected, the singular pitch frequency point is set to zero. When the quantity of frames including continuous zero pitch frequency points is less than the second preset frame quantity, a pitch frequency value of each of the zero pitch frequency points is changed to a pitch frequency value of the first non-zero pitch frequency point following the continuous zero pitch frequency points in a chronological order. The second preset frame quantity may be set to 15. When the quantity of frames including continuous zero pitch frequency points is greater than the second preset frame quantity, the pitch frequency points are removed. The singular pitch frequency point is removed, so as to eliminate invalid pitch frequency points caused by noises, thereby reducing a noise effect.

Figure 6:
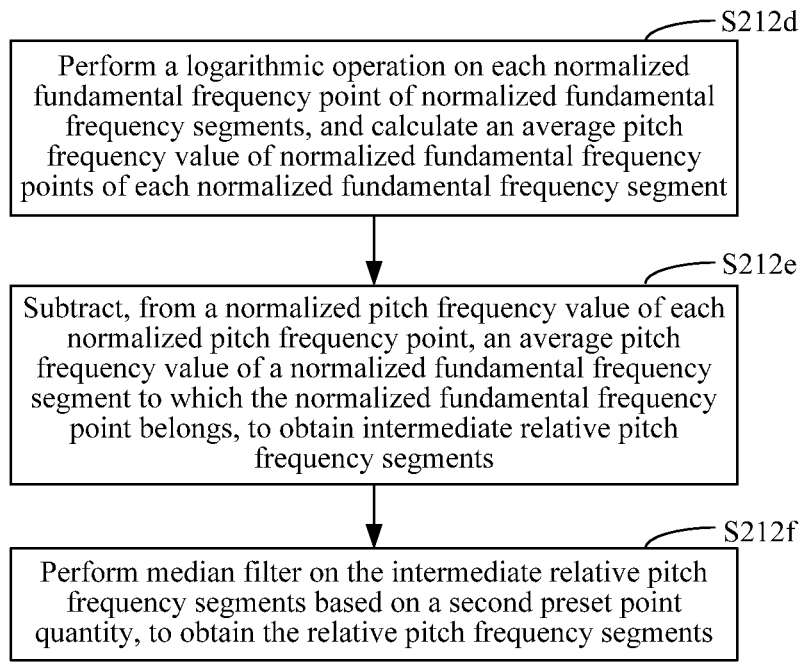
FIG. 6 is a flowchart of performing mean normalization on a normalized pitch frequency to obtain a relative pitch frequency according to some embodiments of the present disclosure.

In an exemplary embodiment, as shown in FIG. 6, the exemplary step S212 includes the following exemplary steps.

In S212d: Performing a logarithmic operation on each normalized pitch frequency point of the normalized pitch frequency segments, and calculating an average pitch frequency value of normalized pitch frequency points of each normalized pitch frequency segment.

For example, log value calculation is performed on a pitch frequency value of each normalized pitch frequency point, and then the average pitch frequency value of the normalized pitch frequency points of each normalized pitch frequency segment is calculated by using the normalized pitch frequency segment as a unit.

In S212e: Subtracting, from a normalized pitch frequency value of each normalized pitch frequency point, an average pitch frequency value of a normalized pitch frequency segment to which the normalized pitch frequency point belongs, to obtain intermediate relative pitch frequency segments.

For example, an intermediate relative pitch frequency value of normalized pitch frequency points of each normalized pitch frequency segment is calculated by using the normalized pitch frequency segment as a unit. For example, the intermediate relative pitch frequency value is obtained by subtracting, from a normalized pitch frequency value of each normalized pitch frequency point, the average pitch frequency value of the normalized pitch frequency segment to which the normalized pitch frequency point belongs, thereby reducing an effect of a high or low start key on pitch frequency calculation.

In S212f: Performing median filter on the intermediate relative pitch frequency segments based on a second preset point quantity, to obtain the relative pitch frequency segments.

For example, the second preset point quantity may be self-defined. For example, the second preset point quantity may be defined to be 10 points. 10-point-based median filter is performed on intermediate relative pitch frequency values of intermediate relative pitch frequency points of an intermediate relative pitch frequency segment to obtain a final relative pitch frequency segment.

Figure 7:
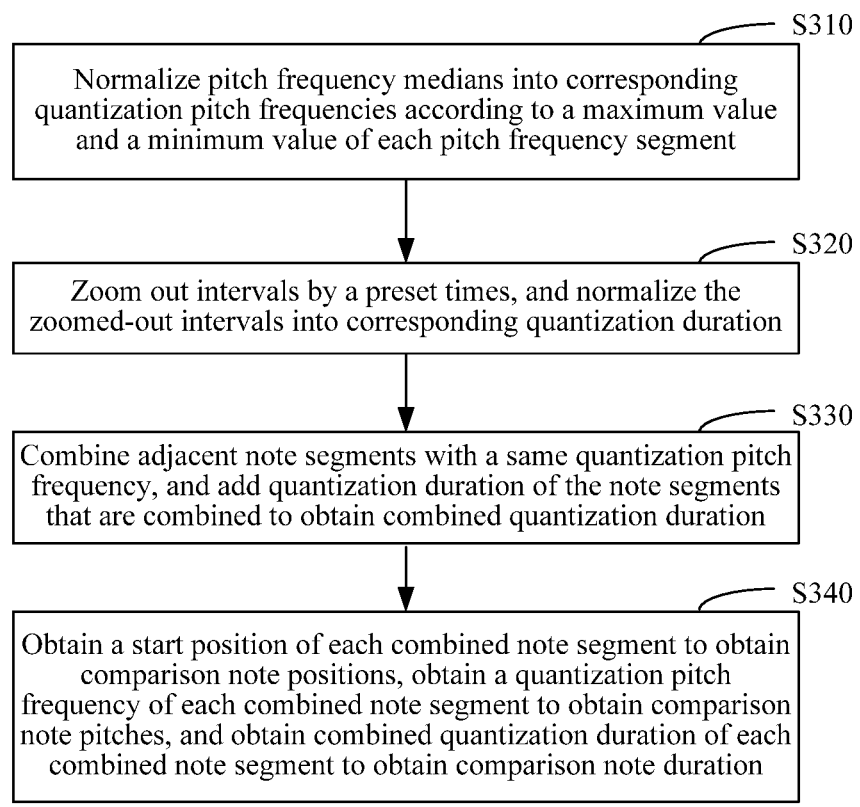
FIG. 7 is a flowchart of quantizing a comparison note sequence according to some embodiments of the present disclosure.

In an exemplary embodiment, as shown in FIG. 7, before the step of outputting the comparison note positions, the comparison note pitches, and the comparison note duration, the method further includes the following exemplary steps.

In S310: Normalize the pitch frequency medians into corresponding quantization pitch frequencies according to a maximum value and a minimum value of each pitch frequency segment.

For example, the quantity and values of the quantization pitch frequencies may be self-defined. For example, the quantization pitch frequencies may be defined to be integers 0 to 24. A pitch frequency value range corresponding to each quantization pitch frequency is calculated according to a maximum value and a minimum value of each pitch frequency segment. A quantization pitch frequency corresponding to each pitch frequency median is obtained according to a correspondence between the quantization pitch frequency and the pitch frequency value range. For example, a pitch frequency value range corresponding to a quantization pitch frequency 0 is 0 to 25. When a pitch frequency median currently needs to be quantized is 10, which is within the range of 0 to 25, the quantization pitch frequency obtained after quantization is 0.

In S320: Zooming out the intervals by a preset multiples, and normalize the zoomed-out intervals into corresponding quantization duration.

For example, the quantity and values of the quantization duration may be self-defined. For example, the quantization duration may be self-defined to be integers 0 to 20. A note duration range corresponding to each quantization duration may be self-defined. The preset multiples may be self-defined. For example, the preset multiples may be defined to be 10. An interval is divided by 10 to obtain zoomed-out duration, and quantization duration corresponding to the zoomed-out duration is found according to a correspondence between the note duration range and the quantization duration.

In S330: Combining adjacent note segments with a same quantization pitch frequency, and adding quantization duration of the note segments that are combined, to obtain combined quantization duration.

For example, each note segment has a corresponding quantization pitch frequency. Adjacent note segments with a same quantization pitch frequency are combined. Quantization duration corresponding to a combined note segment is the sum of quantization duration of the note segments before combination.

In S340: Obtaining a start position of each combined note segment to obtain the comparison note positions, obtaining a quantization pitch frequency of each combined note segment to obtain the comparison note pitches, and obtaining combined quantization duration of each combined note segment to obtain the comparison note duration.

For example, the start position of each combined note segment is a comparison note position of the comparison audio, the quantization pitch frequency is a comparison note pitch of the comparison audio, and the combined quantization duration is comparison note duration of the comparison audio.

Figure 8:
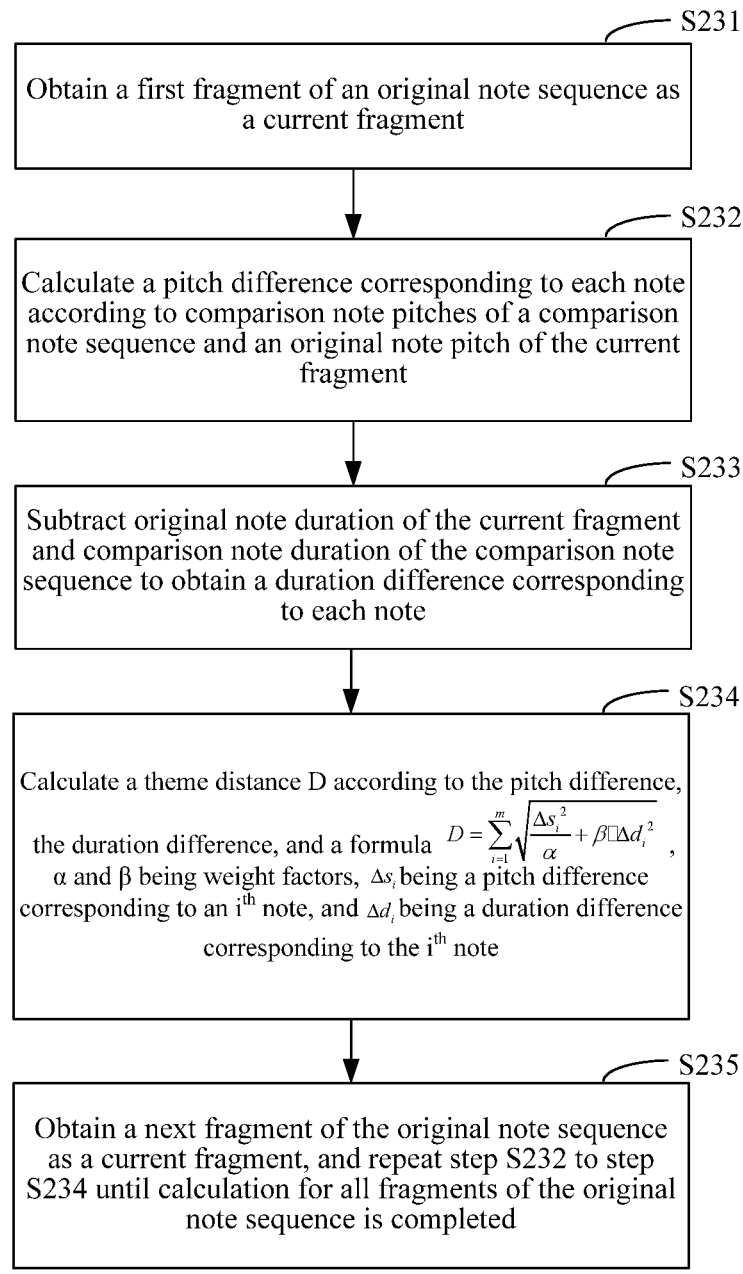
FIG. 8 is a flowchart of calculating a theme distance according to some embodiments of the present disclosure.

In an exemplary embodiment, as shown in FIG. 8, the exemplary step S230 includes the following exemplary steps.

In S231: Obtaining a first fragment of the original note sequence as a current fragment.

For example, when the first fragment of the original note sequence is obtained, a fragment corresponding to notes whose quantity is the same as those of the comparison note sequence of the comparison audio may be sequentially obtained as the current fragment. Alternatively, jump selection may be performed to obtain a fragment corresponding to notes whose quantity is the same as those of the comparison note sequence of the comparison audio as the current fragment.

In S232: Calculating a pitch difference corresponding to each note according to the comparison note pitches of the comparison note sequence and an original note pitch of the current fragment.

For example, a note pitch difference between each note of the comparison note sequence and each note of the current fragment is calculated. In an exemplary embodiment, the note pitch difference is calculated according to a formula $\Delta s_i = \min(abs(p_i-q_i), abs(p_i-q_i-24)+1.0, abs(p_i-q_i+24)+1.0)$, $1 \le i \le m$, m being a quantity of notes of the comparison note sequence, $P_i$ being an $i^{th}$ comparison note pitch, $q_i$ being $i^{th}$ original note pitch, and $\Delta s_i$ being a note difference corresponding to an $i^{th}$ note. Because half frequency multiplication may occur when pitch frequency extraction is performed, 1.0 is introduced in the formula to represent half frequency multiplication penalty.

In S233: Subtracting original note duration of the current fragment and the comparison note duration of the comparison note sequence to obtain a duration difference corresponding to each note.

For example, the original note duration of each note of the current fragment and the comparison note duration of each note of the comparison note sequence are subtracted and an absolute value is calculated to obtain a duration difference $\Delta d_i$ corresponding to each note, $1 \le i \le m$, m being a quantity of notes of the comparison note sequence.

In S234: Calculate a theme distance D according to the pitch difference, the duration difference, and a formula $$D = \sum_{i=1}^{m} \sqrt{\frac{\Delta s_i^2}{\alpha} + \beta \Box \Delta d_i^2},$$

α and β being weight factors, $\Delta s_i$ being a pitch difference corresponding to the $i^{th}$ note, and $\Delta d_i$ being a duration difference corresponding to the $i^{th}$ note.

For example, a theme distance of each note is calculated, and theme distances of all notes of the current fragment are added to obtain the theme distance of the current fragment, α and β being weight factors and being self-defined according to requirements. For example, α=4 and β=0.4.

In S235: Obtaining a next fragment of the original note sequence as a current fragment, and repeat in S232 to in S234 until calculation for all fragments of the original note sequence is completed.

For example, when calculation of the theme distance of the current fragment is completed, a next fragment of the original note sequence is obtained and calculation continues until all the fragments of the original note sequence are selected.

In an exemplary embodiment, a dynamic programming algorithm is used when the theme distances between the fragments of the comparison audio and the fragments of the original audio are calculated.

For example, the dynamic programming algorithm is based on a dynamic programming idea, solves a template matching problem due to different pronunciation lengths, and is a classic algorithm. The dynamic programming algorithm is used for calculating the theme distance, so that a fragment selected from the original note sequence may include a note obtained by jump selection. Moreover, more comprehensive fragments are selected, making a result of the smallest theme distance more accurate.

Figure 9:
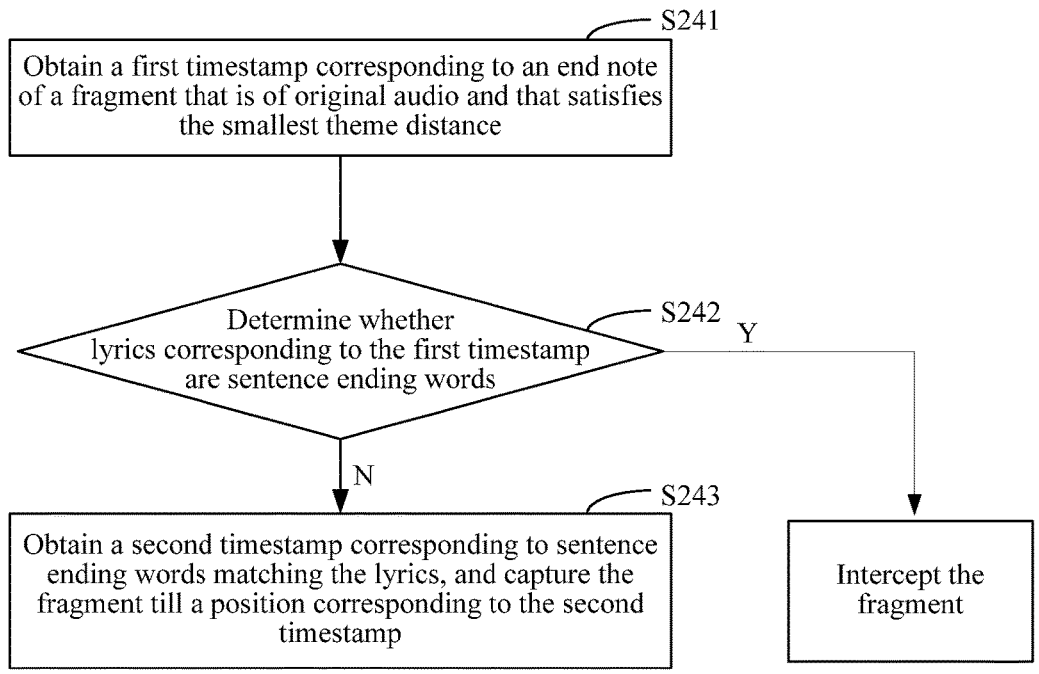
FIG. 9 is a flowchart of capturing a fragment of original audio to generate audio according to some embodiments of the present disclosure.

In an exemplary embodiment, as shown in FIG. 9, the exemplary step S240 includes the following exemplary steps.

In S241: Obtaining a first timestamp corresponding to an end note of the fragment that is of the original audio and that satisfies the smallest theme distance.

For example, when the theme distance is calculated, the fragment that is of the original note sequence and that satisfies the smallest theme distance is a target fragment, and a note position of an end note of the target fragment is obtained. A timestamp corresponding to the note position is the first timestamp.

In S242: Determining whether lyrics corresponding to the first timestamp are sentence ending words; and when the lyrics corresponding to the first timestamp are sentence ending words, capture the fragment; otherwise, step S243 may be performed.

For example, there is a correspondence between a timestamp and lyrics. Lyrics corresponding to the first timestamp are obtained. Whether the lyrics are sentence ending words may be determined by determining whether a next character of the lyrics is a punctuation. When the lyrics corresponding to the first timestamp are sentence ending words, a fragment is captured till a position corresponding to the first timestamp.

In S243: Obtaining a second timestamp corresponding to sentence ending words matching the lyrics, and capturing the fragment till at a position corresponding to the second timestamp.

For example, when the lyrics are not sentence ending words, sentence ending words matching the lyrics are obtained, and the second timestamp corresponding to the sentence ending words is used as an end position of fragment capturing.

In an exemplary embodiment, the original audio matching with the comparison audio is obtained via audio fingerprint retrieval.

For example, the audio fingerprint is used for uniquely identifying a song. That is, the audio fingerprint is used for uniquely identifying a melody, a singer, and lyrics of the song. When at least one pair of melodies, singers, or lyrics of two songs is different, corresponding fingerprint features are also different. Therefore, valid information identifying the song may be obtained by obtaining fingerprint features of the song. The original audio matching with the comparison audio may be rapidly obtained via audio fingerprint retrieval.

Figure 10:
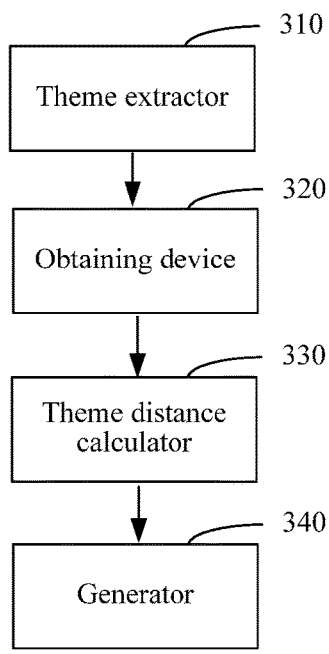
FIG. 10 is a structural block diagram of an exemplary server according to some embodiments of the present disclosure.

In an exemplary embodiment, as shown in FIG. 10, a server is provided and includes a memory and a processor. The memory stores an instruction, and when the instruction is executed by the processor, the server includes:

a theme extractor 310, configured to obtain comparison audio, and perform theme extraction on the comparison audio to obtain a comparison note sequence, the comparison note sequence including comparison note positions, comparison note pitches, and comparison note duration;

an obtaining device 320, configured to obtain original audio matching with the comparison audio via audio retrieval, and obtain an original note sequence corresponding to the original audio, the original note sequence being obtained by performing theme extraction on the original audio, and the original note sequence including original note positions, original note pitches, and original note duration;

a theme distance calculator 330, configured to calculate theme distances between fragments of the comparison audio and fragments of the original audio according to the comparison note sequence and the original note sequence; and a generator 340, configured to capture a fragment that is of the original audio and that satisfies the smallest theme distance as generated audio.

Figure 11:
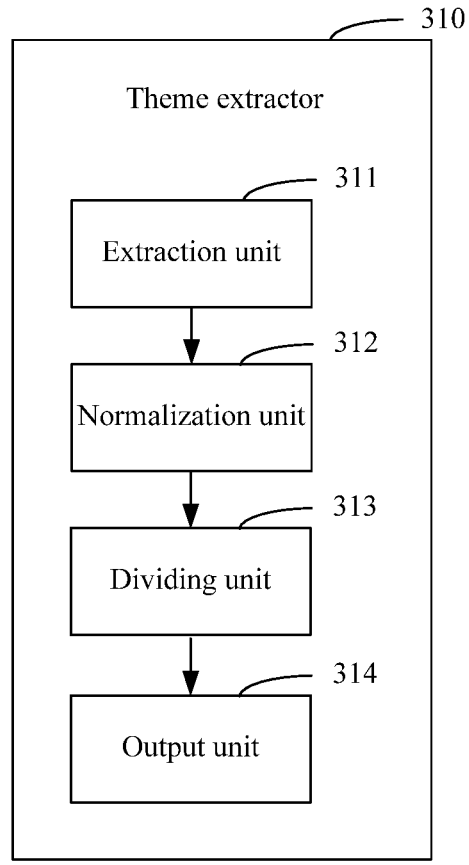
FIG. 11 is a structural block diagram of an exemplary theme extractor according to some embodiments of the present disclosure.

In an exemplary embodiment, as shown in FIG. 11, the theme extractor 310 includes:

an extraction unit 311, configured to extract a voice part in the comparison audio and extract a pitch frequency of each audio frame of the voice part;

a normalization unit 312, configured to: segment the pitch frequency according to a zero pitch frequency point in the pitch frequency to obtain pitch frequency segments; perform pitch frequency normalization on the pitch frequency segments to obtain normalized pitch frequency segments; and perform mean normalization on the normalized pitch frequency segments to obtain relative pitch frequency segments;

a dividing unit 313, configured to divide the relative pitch frequency segments into different note segments according to a frequency difference between adjacent relative pitch frequency points of the relative pitch frequency segments; and an output unit 314, configured to calculate pitch frequency medians of the note segments to obtain the comparison note pitches, obtain a start position of each note segment to obtain the comparison note positions, obtain an interval between the start position and an end position of each note segment to obtain the comparison note duration, and output the comparison note positions, the comparison note pitches, and the comparison note duration.

Figure 12:
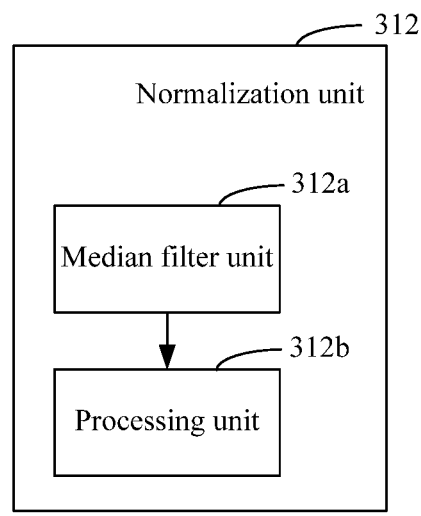
FIG. 12 is a structural block diagram of an exemplary normalization unit according to some embodiments of the present disclosure.

In an exemplary embodiment, as shown in FIG. 12, the normalization unit 312 includes:

a median filter unit 312a, configured to: obtain the length of the pitch frequency segments; and when the length of the pitch frequency segments is less than a first preset frame quantity, perform, on the pitch frequency segments, median filter based on a window length that is equal to the length of the pitch frequency segments; otherwise, perform median filter on the pitch frequency segments based on a first preset point quantity; and a processing unit 312b, configured to: compress the length of the pitch frequency segment; detect a singular pitch frequency point, and set the singular pitch frequency point to zero; and when a quantity of frames including continuous zero pitch frequency points is less than a second preset frame quantity, change a pitch frequency value of each of the zero pitch frequency points to a pitch frequency value of the first non-zero pitch frequency point following the continuous zero pitch frequency points in a chronological order; otherwise, remove the zero pitch frequency points.

In an exemplary embodiment, the normalization unit 312 is further configured to: perform a logarithmic operation on each normalized pitch frequency point of the normalized pitch frequency segments, and calculate an average pitch frequency value of normalized pitch frequency points of each normalized pitch frequency segment; subtract, from a normalized pitch frequency value of each normalized pitch frequency point, an average pitch frequency value of a normalized pitch frequency segment to which the normalized pitch frequency point belongs, to obtain intermediate relative pitch frequency segments; and perform median filter on the intermediate relative pitch frequency segments based on a second preset point quantity, to obtain the relative pitch frequency segments.

Figure 13:
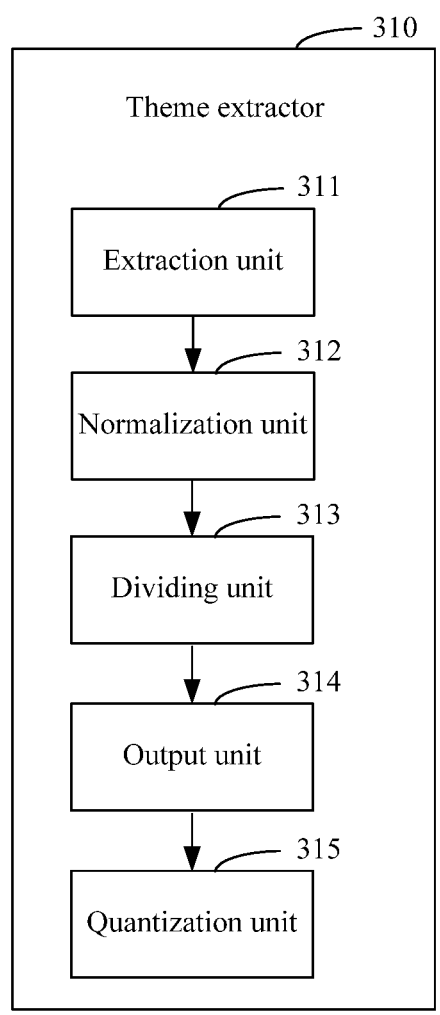
FIG. 13 is a structural block diagram of an exemplary theme extractor according to another embodiment.

In an exemplary embodiment, as shown in FIG. 13, the theme extractor 310 further includes:

a quantization unit 315, configured to normalize the pitch frequency medians into corresponding quantization pitch frequencies according to a maximum value and a minimum value of each pitch frequency segment, zoom out the intervals by a preset multiples, normalize the zoomed-out intervals into corresponding quantization duration, combine adjacent note segments with a same quantization pitch frequency, and add quantization duration of the note segments that are combined, to obtain combined quantization duration.

The output unit 314 is further configured to obtain a start position of each combined note segment to obtain the comparison note positions, obtain a quantization pitch frequency of each combined note segment to obtain the comparison note pitches, and obtain combined quantization duration of each combined note segment to obtain the comparison note duration.

Figure 14:
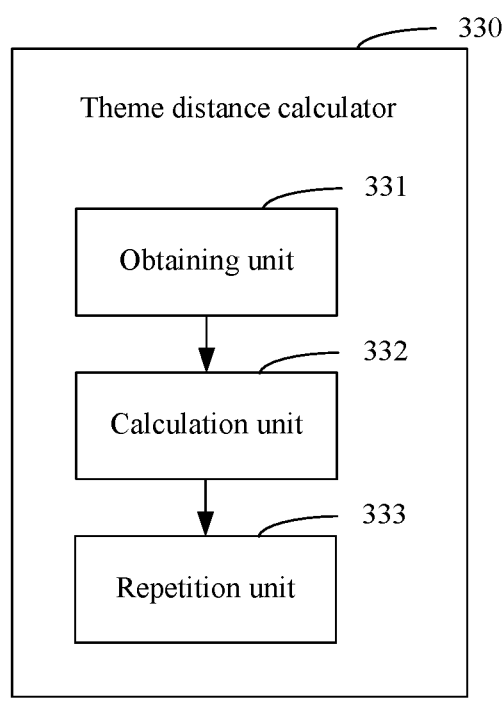
FIG. 14 is a structural block diagram of an exemplary theme distance calculator according to some embodiments of the present disclosure.

In an exemplary embodiment, as shown in FIG. 14, the theme distance calculator 330 includes:

an obtaining unit 331, configured to obtain a first fragment of the original note sequence as a current fragment;

a calculation unit 332, configured to: calculate a pitch difference corresponding to each note according to the comparison note pitches of the comparison note sequence and an original note pitch of the current fragment; subtract original note duration of the current fragment and the comparison note duration of the comparison note sequence to obtain a duration difference corresponding to each note; and calculate a theme distance D according to the pitch difference, the duration difference, and a formula $$D = \sum_{i=1}^{m} \sqrt{\frac{\Delta s_i^2}{\alpha} + \beta \Box \Delta d_i^2},$$

α and β being weight factors, $\Delta s_i$ being a pitch difference corresponding to an $i^{th}$ note, $\Delta d_i$ being a duration difference corresponding to the $i^{th}$ note, 1≤i≤m, and m being a quantity of notes of the comparison note sequence; and a repetition unit 333, configured to obtain a next fragment of the original note sequence, and repeat the steps performed by the calculation unit until calculation for all fragments of the original note sequence is completed.

In an exemplary embodiment, a dynamic programming algorithm is used when the calculation unit 332 calculates the theme distances between the fragments of the comparison audio and the fragments of the original audio.

In an exemplary embodiment, the generator 340 is further configured to: obtain a first timestamp corresponding to an end note of the fragment that is of the original audio and that satisfies the smallest theme distance; determine whether lyrics corresponding to the first timestamp are sentence ending words; and when the lyrics corresponding to the first timestamp are sentence ending words, capture the fragment; or when the lyrics corresponding to the first timestamp are not sentence ending words, obtain a second timestamp corresponding to sentence ending words matching the lyrics, and capture the fragment till at a position corresponding to the second timestamp.

In an exemplary embodiment, the obtaining device 320 obtains the original audio matching with the comparison audio via audio fingerprint retrieval.

In one embodiment, one or more non-volatile computer storage media storing computer readable instructions are provided, the computer readable instructions, when executed by one or more processors, causing the one or more processors to perform the following exemplary steps.

obtaining comparison audio, and performing theme extraction on the comparison audio to obtain a comparison note sequence, the comparison note sequence including comparison note positions, comparison note pitches, and comparison note duration;

obtaining original audio matching with the comparison audio via audio retrieval, and obtaining an original note sequence corresponding to the original audio, the original note sequence being obtained by performing theme extraction on the original audio, and the original note sequence including original note positions, original note pitches, and original note duration;

calculating theme distances between fragments of the comparison audio and fragments of the original audio according to the comparison note sequence and the original note sequence; and capturing a fragment that is of the original audio and that satisfies the smallest theme distance as generated audio.

A person of ordinary skill in the art may understand that all or some procedures of the methods in the foregoing embodiments may be implemented by a computer program instructing relevant hardware. The program may be stored in a computer readable storage medium. When the program is executed, the procedures of the methods in the embodiments may be included. The storage medium may be a magnetic disk, an optical disc, a read-only memory (ROM), a random access memory (RAM), or the like.

The technical features of the foregoing embodiments may be randomly combined. For brevity, not all the possible combinations of the technical features in the foregoing embodiments are described. However, the technical features shall be construed as falling within the scope of this specification provided that no conflict exists in the combinations of the technical features.

The foregoing embodiments only describe several implementation manners of the present disclosure, and are described in detail, but they should not be construed as a limitation to the patent scope of the present disclosure. It should be noted that a person of ordinary skill in the art may further make variations and improvements without departing from the ideas of the present disclosure, which shall fall within the protection scope of the present disclosure. Therefore, the patent protection scope of the present disclosure should be subject to the appended claims.

What is claimed is:

1. An audio generation method, applied to a server including at least a memory and a processor, the method comprising:

obtaining a comparison audio, and performing a theme extraction on the comparison audio to obtain a comparison note sequence, the comparison note sequence comprising comparison note positions, comparison note pitches, and a comparison note duration;

obtaining an original audio matching with the comparison audio via audio retrieval, and obtaining an original note sequence corresponding to the original audio by performing a theme extraction on the original audio, the original note sequence comprising original note positions, original note pitches, and an original note duration;

calculating theme distances between fragments of the comparison audio and fragments of the original audio according to the comparison note sequence and the original note sequence; and generating an audio by capturing a fragment that is of the original audio and that satisfies a smallest theme distance, comprising:

obtaining a first timestamp corresponding to an end note of the fragment;

determining whether lyrics corresponding to the first timestamp are sentence ending words;

when the lyrics corresponding to the first timestamp are sentence ending words, capturing the fragment; and when the lyrics corresponding to the first timestamp are not sentence ending words, obtaining a second timestamp corresponding to sentence ending words matching the lyrics, and capturing the fragment till at a position corresponding to the second timestamp.

2. The method according to claim 1, wherein performing the theme extraction on the comparison audio to obtain the comparison note sequence comprises:
  extracting a voice part in the comparison audio;
  extracting a pitch frequency of each audio frame of the voice part;
  obtaining pitch frequency segments by segmenting the pitch frequency according to a zero pitch frequency point in the pitch frequency;
  performing pitch frequency normalization on the pitch frequency segments to obtain normalized pitch frequency segments;
  performing mean normalization on the normalized pitch frequency segments to obtain relative pitch frequency segments;
  dividing the relative pitch frequency segments into different note segments according to a frequency difference between adjacent relative pitch frequency points of the relative pitch frequency segments;
  calculating pitch frequency medians of the note segments to obtain the comparison note pitches;
  obtaining a start position of each note segment to obtain the comparison note positions; and
  obtaining an interval between the start position and an end position of each note segment to obtain the comparison note duration, and outputting the comparison note positions, the comparison note pitches, and the comparison note duration.

3. The method according to claim 2, wherein performing the pitch frequency normalization on the pitch frequency segments to obtain the normalized pitch frequency segments comprises:
  obtaining a length of the pitch frequency segments; and when the length of the pitch frequency segments is less than a first preset frame quantity, and performing, on the pitch frequency segments, a median filter, based on a window length that is equal to the length of the pitch frequency segments or based on a first preset point quantity;
  compressing the length of the pitch frequency segments;
  detecting a singular pitch frequency point, and setting the singular pitch frequency point to zero; and
  when a quantity of frames comprising continuous zero pitch frequency points is less than a second preset frame quantity, changing a pitch frequency value of each of the zero pitch frequency points to a pitch frequency value of the first non-zero pitch frequency point following the continuous zero pitch frequency points in a chronological order; otherwise, removing the zero pitch frequency points.

4. The method according to claim 2, wherein performing the mean normalization on the normalized pitch frequency segments to obtain the relative pitch frequency segments comprises:
  performing a logarithmic operation on each normalized pitch frequency point of the normalized pitch frequency segments, and calculating an average pitch frequency value of normalized pitch frequency points of each normalized pitch frequency segment;
  subtracting, from a normalized pitch frequency value of each normalized pitch frequency point, an average pitch frequency value of a normalized pitch frequency segment to which the normalized pitch frequency point belongs, to obtain intermediate relative pitch frequency segments; and
  performing a median filter on the intermediate relative pitch frequency segments based on a second preset point quantity, to obtain the relative pitch frequency segments.

5. The method according to claim 2, wherein, before outputting the comparison note positions, the comparison note pitches, and the comparison note duration, the method further comprises:
  normalizing the pitch frequency medians into corresponding quantization pitch frequencies according to a maximum value and a minimum value of each pitch frequency segment;
  zooming out the intervals by a preset multiples, and normalizing the zoomed-out intervals into corresponding quantization duration;
  combining adjacent note segments with a same quantization pitch frequency, and adding quantization duration of the note segments that are combined, to obtain combined quantization duration;
  obtaining a start position of each combined note segment to obtain the comparison note positions;
  obtaining a quantization pitch frequency of each combined note segment to obtain the comparison note pitches; and
  obtaining combined quantization duration of each combined note segment to obtain the comparison note duration.

6. The method according to claim 1, wherein calculating the theme distances between the fragments of the comparison audio and the fragments of the original audio according to the comparison note sequence and the original note sequence comprises:
  obtaining a first fragment of the original note sequence as a current fragment;
  S1: calculating a pitch difference corresponding to each note according to the comparison note pitches of the comparison note sequence and an original note pitch of the current fragment;
  S2: subtracting original note duration of the current fragment and the comparison note duration of the comparison note sequence to obtain a duration difference corresponding to each note;
  S3: calculating a theme distance D according to the pitch difference, the duration difference, and a formula $$D = \sum_{i=1}^{m} \sqrt{\frac{\Delta s_i^2}{\alpha} + \beta \square \Delta d_i^2},$$

$\alpha$ and $\beta$ being weight factors, $\Delta s_i$ being a pitch difference corresponding to an $i^{th}$ note, $\Delta d_i$ being a duration difference corresponding to the $i^{th}$ note, $1 \le i \le m$, and m being a quantity of notes of the comparison note sequence; and
  obtaining a next fragment of the original note sequence as a current fragment, and repeatedly performing S1 to in S3 until calculation for all fragments of the original note sequence is completed.

7. The method according to claim 1, wherein a dynamic programming algorithm is used when the theme distances between the fragments of the comparison audio and the fragments of the original audio are calculated.

8. The method according to claim 1, wherein obtaining the original audio matching with the comparison audio via audio retrieval includes:

obtaining the original audio matching with the comparison audio via audio fingerprint retrieval.

9. A server, comprising:
a memory, storing program instructions for an audio generation method, and
a processor, coupled to the memory and, when executing the program instructions, configured for:
obtaining comparison audio, and performing a theme extraction on the comparison audio to obtain a comparison note sequence, the comparison note sequence comprising comparison note positions, comparison note pitches, and a comparison note duration;
obtaining an original audio matching with the comparison audio via audio retrieval, and obtaining an original note sequence corresponding to the original audio by performing a theme extraction on the original audio, the original note sequence comprising original note positions, original note pitches, and an original note duration;
calculating theme distances between fragments of the comparison audio and fragments of the original audio according to the comparison note sequence and the original note sequence; and
generating an audio by capturing a fragment that is of the original audio and that satisfies a smallest theme distance, comprising:
obtaining a first timestamp corresponding to an end note of the fragment;
determining whether lyrics corresponding to the first timestamp are sentence ending words;
when the lyrics corresponding to the first timestamp are sentence ending words, capturing the fragment; and
when the lyrics corresponding to the first timestamp are not sentence ending words, obtaining a second timestamp corresponding to sentence ending words matching the lyrics, and capturing the fragment till at a position corresponding to the second timestamp.

10. The server according to claim 9, wherein performing the theme extraction on the comparison audio to obtain the comparison note sequence comprises:
extracting a voice part in the comparison audio;
extracting a pitch frequency of each audio frame of the voice part;
obtaining pitch frequency segments by segmenting the pitch frequency according to a zero pitch frequency point in the pitch frequency;
performing pitch frequency normalization on the pitch frequency segments to obtain normalized pitch frequency segments;
performing mean normalization on the normalized pitch frequency segments to obtain relative pitch frequency segments;
dividing the relative pitch frequency segments into different note segments according to a frequency difference between adjacent relative pitch frequency points of the relative pitch frequency segments;
calculating pitch frequency medians of the note segments to obtain the comparison note pitches;
obtaining a start position of each note segment to obtain the comparison note positions; and
obtaining an interval between the start position and an end position of each note segment to obtain the comparison note duration, and outputting the comparison note positions, the comparison note pitches, and the comparison note duration.

11. The server according to claim 10, wherein performing the pitch frequency normalization on the pitch frequency segments to obtain the normalized pitch frequency segments comprises:
obtaining a length of the pitch frequency segments; and
when the length of the pitch frequency segments is less than a first preset frame quantity, and performing, on the pitch frequency segments, a median filter, based on a window length that is equal to the length of the pitch frequency segments or based on a first preset point quantity;
compressing the length of the pitch frequency segments;
detecting a singular pitch frequency point, and setting the singular pitch frequency point to zero; and
when a quantity of frames comprising continuous zero pitch frequency points is less than a second preset frame quantity, changing a pitch frequency value of each of the zero pitch frequency points to a pitch frequency value of the first non-zero pitch frequency point following the continuous zero pitch frequency points in a chronological order; otherwise, removing the zero pitch frequency points.

12. The server according to claim 10, wherein performing the mean normalization on the normalized pitch frequency segments to obtain the relative pitch frequency segments comprises:
performing a logarithmic operation on each normalized pitch frequency point of the normalized pitch frequency segments, and calculating an average pitch frequency value of normalized pitch frequency points of each normalized pitch frequency segment;
subtracting, from a normalized pitch frequency value of each normalized pitch frequency point, an average pitch frequency value of a normalized pitch frequency segment to which the normalized pitch frequency point belongs, to obtain intermediate relative pitch frequency segments; and
performing a median filter on the intermediate relative pitch frequency segments based on a second preset point quantity, to obtain the relative pitch frequency segments.

13. The server according to claim 10, wherein before outputting the comparison note positions, the comparison note pitches, and the comparison note duration, the processor is further configured for
normalizing the pitch frequency medians into corresponding quantization pitch frequencies according to a maximum value and a minimum value of each pitch frequency segment;
zooming out the intervals by a preset multiples, and normalizing the zoomed-out intervals into corresponding quantization duration;
combining adjacent note segments with a same quantization pitch frequency, and adding quantization duration of the note segments that are combined, to obtain combined quantization duration;
obtaining a start position of each combined note segment to obtain the comparison note positions; and
obtaining a quantization pitch frequency of each combined note segment to obtain the comparison note pitches; and
obtaining combined quantization duration of each combined note segment to obtain the comparison note duration.

14. The server according to claim 9, wherein calculating the theme distances between the fragments of the comparison audio and the fragments of the original audio according to the comparison note sequence and the original note sequence comprises:

obtaining a first fragment of the original note sequence as a current fragment;

S1: calculating a pitch difference corresponding to each note according to the comparison note pitches of the comparison note sequence and an original note pitch of the current fragment;

S2: subtracting original note duration of the current fragment and the comparison note duration of the comparison note sequence to obtain a duration difference corresponding to each note;

S3: calculating a theme distance D according to the pitch difference, the duration difference, and a formula $$D = \sum_{i=1}^{m} \sqrt{\frac{\Delta s_i^2}{\alpha} + \beta \Box \Delta d_i^2},$$

$\alpha$ and $\beta$ being weight factors, $\Delta s_i$ being a pitch difference corresponding to an $i^{th}$ note, $\Delta d_i$ being a duration difference corresponding to the $i^{th}$ note, $1 \le i \le m$, and m being a quantity of notes of the comparison note sequence; and obtaining a next fragment of the original note sequence as a current fragment, and repeatedly performing S1 to in S3 until calculation for all fragments of the original note sequence is completed.

15. The server according to claim 9, wherein a dynamic programming algorithm is used when the theme distances between the fragments of the comparison audio and the fragments of the original audio are calculated.

16. A non-transitory computer-readable storage medium containing computer-executable program instructions for, when executed by a processor, performing an audio generation method, the method comprising:

obtaining a comparison audio, and performing a theme extraction on the comparison audio to obtain a comparison note sequence, the comparison note sequence comprising comparison note positions, comparison note pitches, and a comparison note duration;

obtaining an original audio matching with the comparison audio via audio retrieval, and obtaining an original note sequence corresponding to the original audio by performing a theme extraction on the original audio, the original note sequence comprising original note positions, original note pitches, and an original note duration;

calculating theme distances between fragments of the comparison audio and fragments of the original audio according to the comparison note sequence and the original note sequence; and generating an audio by capturing a fragment that is of the original audio and that satisfies a smallest theme distance, comprising:

obtaining a first timestamp corresponding to an end note of the fragment;

determining whether lyrics corresponding to the first timestamp are sentence ending words;

when the lyrics corresponding to the first timestamp are sentence ending words, capturing the fragment; and when the lyrics corresponding to the first timestamp are not sentence ending words, obtaining a second timestamp corresponding to sentence ending words matching the lyrics, and capturing the fragment till at a position corresponding to the second timestamp.

17. The storage medium according to claim 16, wherein performing the theme extraction on the comparison audio to obtain the comparison note sequence comprises:

extracting a voice part in the comparison audio;

extracting a pitch frequency of each audio frame of the voice part;

obtaining pitch frequency segments by segmenting the pitch frequency according to a zero pitch frequency point in the pitch frequency;

performing pitch frequency normalization on the pitch frequency segments to obtain normalized pitch frequency segments;

performing mean normalization on the normalized pitch frequency segments to obtain relative pitch frequency segments;

dividing the relative pitch frequency segments into different note segments according to a frequency difference between adjacent relative pitch frequency points of the relative pitch frequency segments;

calculating pitch frequency medians of the note segments to obtain the comparison note pitches;

obtaining a start position of each note segment to obtain the comparison note positions; and obtaining an interval between the start position and an end position of each note segment to obtain the comparison note duration, and outputting the comparison note positions, the comparison note pitches, and the comparison note duration.

18. The storage medium according to claim 17, wherein performing the pitch frequency normalization on the pitch frequency segments to obtain the normalized pitch frequency segments comprises:

obtaining a length of the pitch frequency segments; and when the length of the pitch frequency segments is less than a first preset frame quantity, and performing, on the pitch frequency segments, a median filter, based on a window length that is equal to the length of the pitch frequency segments or based on a first preset point quantity;

compressing the length of the pitch frequency segments;

detecting a singular pitch frequency point, and setting the singular pitch frequency point to zero; and when a quantity of frames comprising continuous zero pitch frequency points is less than a second preset frame quantity, changing a pitch frequency value of each of the zero pitch frequency points to a pitch frequency value of the first non-zero pitch frequency point following the continuous zero pitch frequency points in a chronological order; otherwise, removing the zero pitch frequency points.

* * * * *